United States Patent [19]

Brockmiller

[11] 4,153,270
[45] May 8, 1979

[54] SLIDING HITCH-BALL HOLDER AND GUIDE RACK ASSEMBLY

[76] Inventor: Robert L. Brockmiller, R.R. #1, La Grange, Mo. 63448

[21] Appl. No.: 914,242

[22] Filed: Jun. 9, 1978

[51] Int. Cl.² ............................................ B60D 1/18
[52] U.S. Cl. .......................... 280/490 R; 280/415 A; 414/632
[58] Field of Search ........... 280/415 R, 415 A, 490 R; 214/86 A, 673, 672, 674, 620; 254/86 H, 45

[56] References Cited

U.S. PATENT DOCUMENTS

| | | | |
|---|---|---|---|
| 1,657,674 | 1/1928 | Holms | 214/86 A |
| 2,910,203 | 10/1959 | Todd | 214/672 |
| 3,441,158 | 4/1969 | Wilson | 214/672 |
| 4,000,911 | 1/1977 | Weber | 280/490 R |

*Primary Examiner*—David M. Mitchell
*Assistant Examiner*—R. Schrecengost
*Attorney, Agent, or Firm*—Sughrue, Rothwell, Mion, Zinn and Macpeak

[57] ABSTRACT

Paired, laterally opposed generally vertical poles mounted at their lower ends to a towing vehicle horizontal frame and pivotable about a horizontal axis, bear a carriage which extends between the poles and is mounted on rollers for vertical movement on the poles. A hitch-ball carrier extends from the carriage for coupling to the end of the mobile home. Paired hydraulic cylinders pivotably mounted to the frame at their lower ends pivot about a horizontal axis parallel to and generally at the same vertical height as the horizontal pivot axis for the poles, have their upper ends, which are extendable, pivotably connected to the carriage. Paired telescoping beam assemblies are pivotably coupled at one end to the horizontal frame at a point spaced some distance from the pivot mountings of the paired vertical poles and are pivotably coupled at their other end to the upper ends of the laterally opposed vertical poles. By extension or retraction of the telescoping beam assemblies and the locking of the same at a given position, the orientation of the carriage and the hitch-ball may be maintained at true vertical on site, regardless of the angle of inclination of the vehicle.

11 Claims, 9 Drawing Figures

SLIDING HITCH-BALL HOLDER AND GUIDE RACK ASSEMBLY

FIELD OF THE INVENTION

This invention relates to a sliding hitch-ball holder and guide rack assembly for supporting modular and factory built homes for transport and for facilitating the setting up of the home on preformed foundation, at site and after transport.

BACKGROUND OF THE INVENTION

In the past, prior to delivery of modular and factory built homes including single wide homes, double wide homes and the like, the customer's site was prepared by forming the basement or other foundation walls which extend to a given height above the ground. If the basement walls on site extended four feet or more above the ground, usually a crane is required to set the modular or factory built home onto the basement or other foundation. This is expensive and causes delays. Particularly, tri-level factory built homes are required to be set over the foundation by means of a crane.

It is, therefore, a primary object of the present invention to provide an improved sliding hitch-ball holder and guide rack assembly for attachment to the rear of a tractor for supporting for transport to site, single wide homes, double wide homes, and for subsequent lifting and placement on the foundation by means of roller kits for rolling the lifted home over the basement or crawl space and into final position.

It is a further object of the present invention to provide an improved sliding hitch-ball holder and guide rack assembly of this type which may be selectively coupled to the home to raise and lower the front or the rear of the home on site for setting up the home on the preformed foundation or basement.

It is a further object of the present invention to provide an improved sliding hitch-ball holder and guide rack assembly for mounting to the rear of a tow truck or tractor to permit the home to be set up on site without initially unhooking the home from the towing vehicle.

It is a further object of the present invention to provide a sliding hitch-ball holder and guide rack assembly which permits selective parking ball units to be attached to the assembly at different heights and at different horizontal displacement from the other components of the guide rack assembly to permit sharp, on-site turns on the trailer-home assembly to facilitate setting up of the home regardless of trees or other obstacles interfering with the set up location.

SUMMARY OF THE INVENTION

The versatile tiltable sliding hitch-ball holder and guide rack assembly of the present invention permits coupling of one end of a mobile home to a tow vehicle, which tow vehicle is provided with a horizontal frame and paired laterally opposed generally vertical poles are mounted at their lower ends to the frame for limited pivoting about a horizontal axis. A carriage extends between the vertical poles and is movable thereon and bears a hitch-ball for coupling to the home one end. At least one hydraulic cylinder mounts at its lower end to the frame for pivoting about a horizontal axis parallel to and at generally the same height as the horizontal pivot axis for the lower ends of the vertical poles. The upper extendable end of the hydraulic cylinder is pivotably connected to the carriage and extension of the hydraulic cylinder causes the carriage and the hitch-ball to rise on the laterally opposed vertical poles. At least one extensible telescoping beam assembly, pivotably coupled at one end to the horizontal frame at a point spaced from the pivot mounting of the paired vertical holes has its other end pivoted to the upper ends of the laterally opposed, generally vertical holes such that by extension or retraction of the telescoping beam assembly and locking of the same in given position, the carriage and the generally vertical poles may be oriented at true vertical regardless of the angle of inclination of the vehicle on site.

DESCRIPTION OF THE PREFERRED EMBODIMENTS

Figure 1:
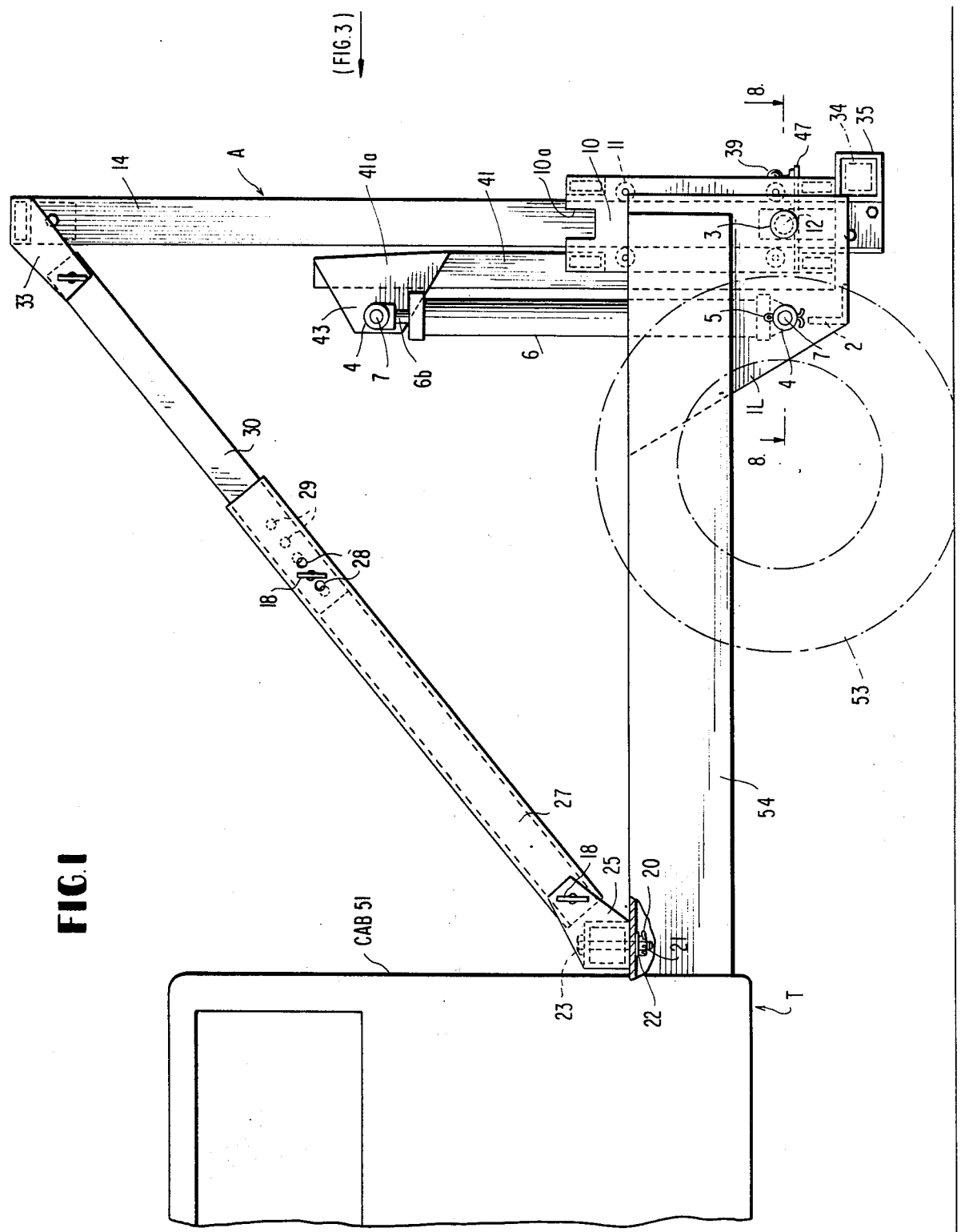
FIG. 1 is a side elevational view of a mobile or modular home towing vehicle incorporating the sliding hitch-ball holder and guide rack assembly at the rear thereof, forming one embodiment of the present invention.

A conventional or modified tractor or similar towing vehicle T, FIG. 1, has mounted to the frame 54 and at the vicinity of the rear wheels 53, behind cab 51, a sliding hitch-ball holder and guide rack assembly indicated generally at A. Spanning transversely across paired vehicle frame members 54 of the towing vehicle T is a cross beam 24 of square cross-section hollow metal construction, the cross beam 24 being secured just behind cab 51 and being mounted to the frame members 54 by means of bolts 23 which pass through the cross beam, carry nuts 21 with washers 22 interposed between the nuts 21 and the frame members 54 and also carry cotter pins at 20 for safety purposes. End plates 25 are welded to the respective ends of the square cross beam 24 and extend obliquely upward away from the rear of the cab and away from the frame 54. Parallel, and adjacent, plates 26 are also welded to the cross beam at both ends, and both places 25 and 26 at both ends of the cross beam 24 are supplied with aligned holes near their outboard ends which receive pins 18, the pins 18 bearing clips at 17. The lower ends of relatively large size telescopic poles 27 of square cross-section through which the pins 18 also project secure the poles 27 to opposed pltes 25-26 at opposite ends of the cross beam 24. The large size poles 27 receive, respectively, smaller size square cross-sectional, hollow telescoping poles 30 which project within the lower poles 27 to a predetermined extent, the outer poles 27 bearing aligned transverse holes 28 which as shown are three in number, while the smaller sized poles 30 each bear similarly sized, aligned but longitudinally spaced holes 29, in this case five in number, which holes 29 can be selectively aligned with the holes 28 to permit the poles 27 and 30 to be locked at different telescoping positions. Locking pins 18 and clips 17 are provided for accomplishing this purpose, as shown. The telescoping poles to each side as at 27 and 30 cooperate with vertical poles 14L and 14R of similar, square hollow metal construction. In that respect, a pair of mounting plates 1L, 1R, or trapezoidal configuration bear holes and are provided with small axial sections of closed end pipes as at 3 at the holes which receive dowels 12 which are fixed to and project outwardly from the sides of the vertical poles 14L and 14R, respectively, on opposite sides of the vehicle body vehicle frame members 54, at the rear thereof, as shown in FIG. 4 to the insides of these members. At the upper ends of the poles 14L and 14R, there is provided a horizontal cross beam 31. The cross beam 31 bears four plates 32 which project downwardly, FIG. 3, the plates 32 being apertured, as are the upper ends of the poles 14L and 14R, through which project bolts 15. The bolts 15 carry lock nuts 16 for securing the bolts in place. The plates 32 project internally of the poles 14L and 14F, FIG. 3. Plates 33 at the outboard ends of the cross beam 31 are also apertured to receive pins 18 which project through holes within the smaller two telescoping poles 30 and again the pins are maintained in place by spring clips 17. The plates 32 and 33 are welded to the cross beam 31.

Figures 8, 9:
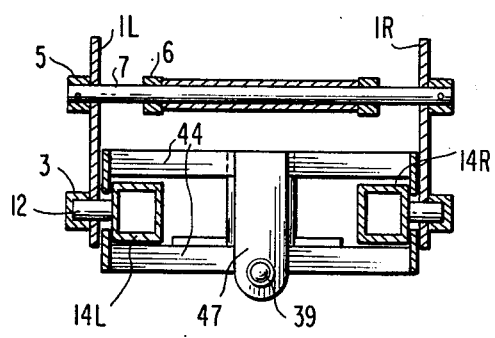
FIG. 8 is a horizontal sectional view of a portion of the sliding hitch-ball holder and guide rack assembly of FIG. 1 taken about line 8—8.
FIG. 9 is a horizontal sectional view of a portion of the sliding hitch-ball holder and guide rack assembly of FIG. 3, taken about line 9—9.

A dual purpose cross beam 35 is provided at the bottom of the assembly extending horizontally across the rear of the equipped towing vehicle T and carries paired plates 36 at both ends, the plates of each pair being spaced to closely receive the lower ends of the vertical poles 14L and 14R, respectively. With the plates welded to the back sides of the dual purpose cross beam 35, this permits by way of bolts 42, and lock nuts 16, FIG. 9, the lower end of the vertical poles 14L and 14R to be fixedly mounted to the dual purpose cross beam 35. A longer, but smaller size square tube 34 is sized so as to be telescoped through the hollow square cross beam 35 and permit the smaller size square tube 34 to be secured to the ground by way of wood blocks B on each end for more stability sidewise when preparing to raise the home, FIG. 3.

At the foot of the vertical poles 14L and 14R, two plates 13 are welded thereto, so that if the bolts 42 would ever come undone, the hitch-ball assembly could never come loose from the towing vehicle T, while the home (not shown) is in transit. Further, if any of the pins 18 work loose in the assembly, the vertical poles 14F and 14L move but move only to a small degree before the poles 14R and 14L come into contact with an angle iron 2 which is welded to plates 1R and 1L at opposite ends. While a home is being transported over the highway, the hitch-ball 39 normally employed in transport is parallel to the pivoting dowel 12, FIG. 2, which allows very little pull on the telescoping poles 27 and 30, FIG. 1.

As noted previously, each larger sized square telescoping pole 27 has three holes 28 bored every two inches apart. Further, the smaller square beam or telescoping pole 30 which has five holes 29 bored every three inches apart can be adjusted to keep the vertical poles 14L and 14R vertical regardless of whether the ground bearing the vehicle T slopes downwardly or upwardly.

Further, the vertical poles 14R and 14L have holes 14a drilled every three to three and one-quarter inches in their front and rear walls of these square cross-sectional members. When the home is in transit, lock pins as at 19, being clips identical to clips 17 for pins 18 etc., are placed in the holes 14a which lie directly above given cross beams 44 of the sliding hitch-ball holder H, FIG. 3, so that the sliding hitch-ball holder H will not roll up and down the vertical poles 14R and 14L when the roads are hilly and/or rough.

Also, the holes are used to place the pins 19 under the sliding hitch-ball holder as at 19' and specifically cross beams 44 of holder H before the workmen are permitted to work under the supported home.

Figure 2:
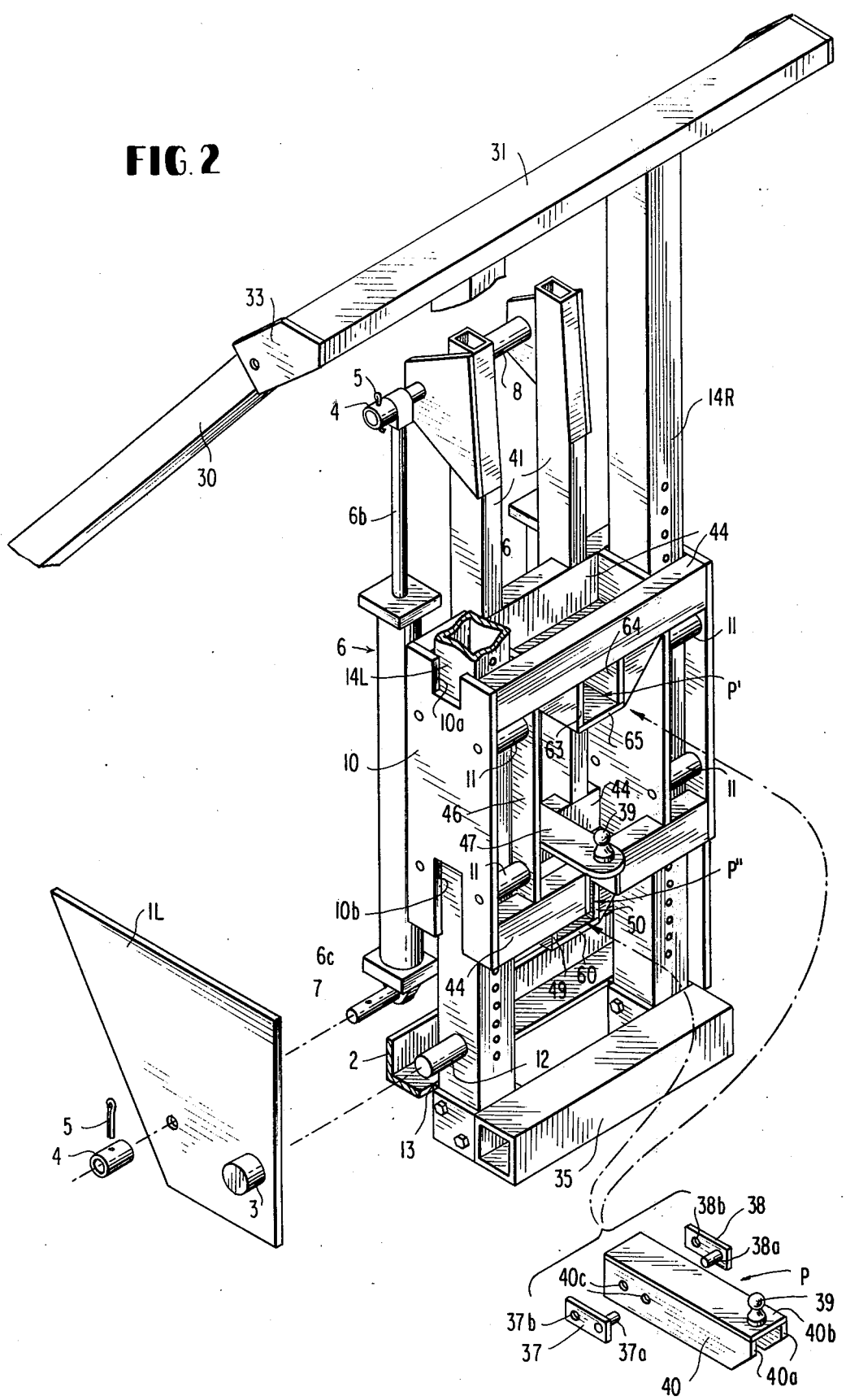
FIG. 2 is a perspective, partially broken away and partially exploded view of the assembly of FIG. 1, including an alternately applied and differently located auxiliary parking ball assembly.

The holder H itself may be best seen in the perspective view of FIG. 2 and comprises an open frame rectangular carriage C including laterally opposed outer plates or sidewalls 10 of H-shaped plan configuration including an upper slot 10a and a lower slot 10b. Spanning between the outer carriage plates 10 are cross beams of square configuration at the four corners, as at 44. The length of the cross beams 44 are such that the opposed outer plates 10 of the carriage are spaced slightly from the opposed outside walls of the respective poles 14L and 14R. Further, carriage C includes opposed inner vertical plates 46 which are of cross plan configuration, having its corners rectangularly recessed through which extend the cross beams 44. The plates 46 lie adjacent the inside walls of respective vertical poles 14L and 14R and are maintained in position and spaced apart by vertically spaced pin mounted rollers 11 which bear on the front and rear surfaces of the poles 14L and 14R such that the rollers 11 guide the vertical movement of carriage C on the vertical poles 14L and 14R. The rollers 11 rotate about their horizontal axes, supported by the pins 11a.

For normal transport of a modular home, a first transport hitch-ball 39 is mounted to a horizontal mounting plate 47 and projects upwardly therefrom, the mounting plate in turn being welded to the top surfaces of the lower two cross beams 44 of carriage C. The ball projects outwardly of the vertical end face of the rearmost beams 44.

Further, while the location of transport hitch-ball 39 spanning the upper surfaces of the lower cross beams 44 is generally near the bottom of the vertically movable carriage C, and while this location permits the transport hitch-ball 39 to be used normally during towing of the modular home, the present invention advantageously permits the use of an auxiliary "parking ball" assembly indicated generally at P, FIG. 2, which is adapted to be quickly mounted to the carriage C at vertical positions both below and above that of transport hitch-ball 39. The "parking ball" assembly P comprises a square type, elongated metal body 40, in this case formed of opposed vertical sidewalls as at 40a and a top wall 40b bearing at one end a vertically oriented section lifting hitch-ball 39'. The sidewalls 40a of the "parking ball" assembly P carry aligned, longitudinally spaced holes 40c, the forward holes of which receive a projecting pin 37a of a left pin assembly 37 on one side and a projecting pin 38a of a right pin assembly 38.

Figure 3:
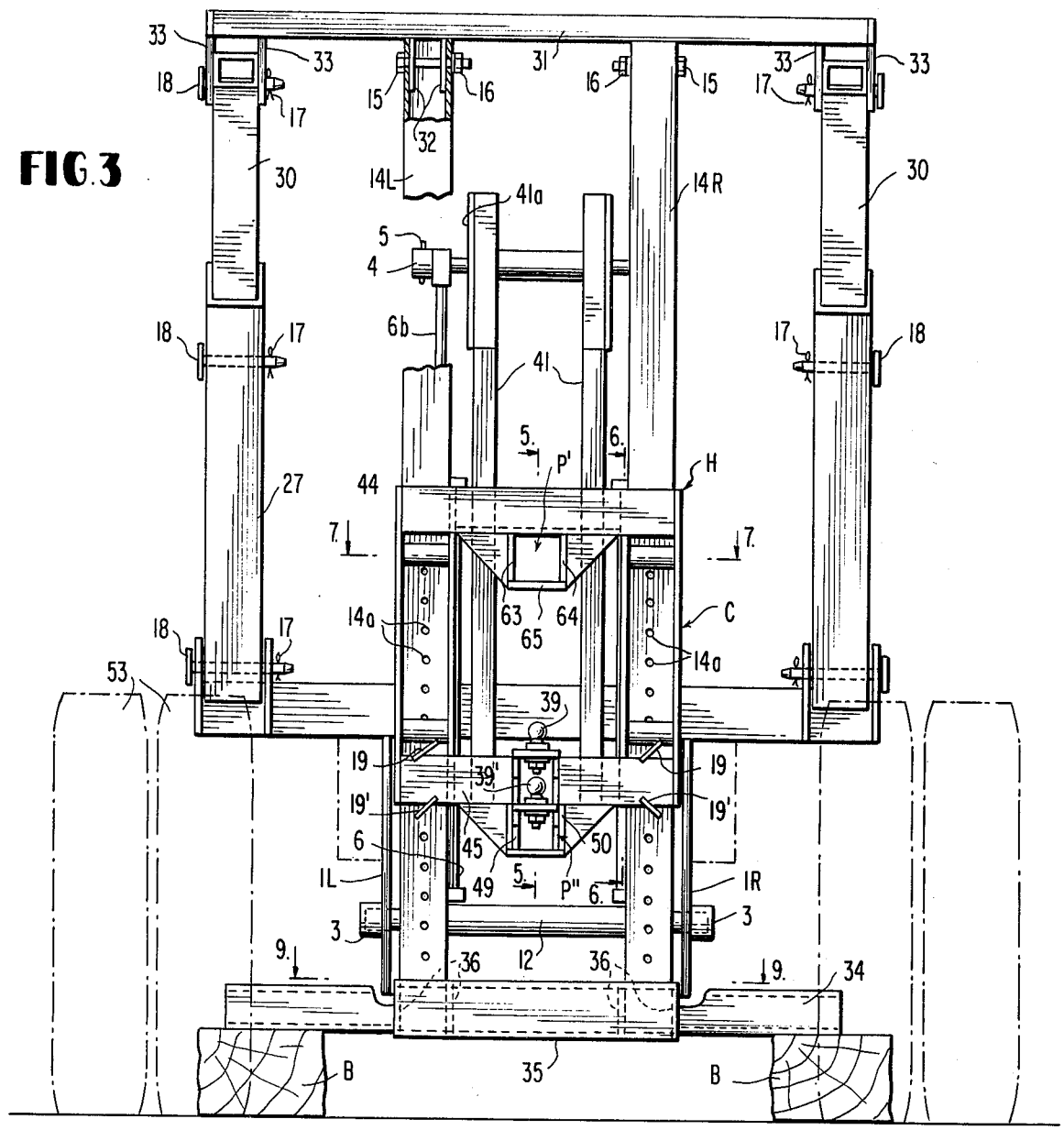
FIG. 3 is an end elevational view of the sliding hitch-ball holder and guide rack assembly equipped vehicle of FIG. 1.
Figure 7:
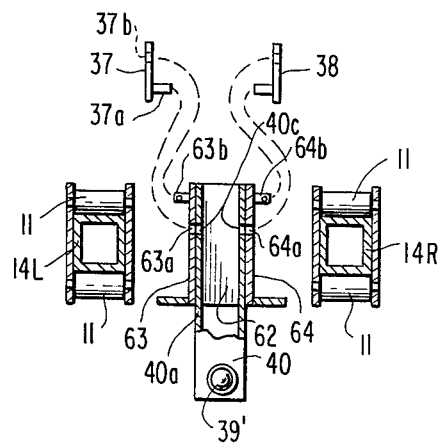
FIG. 7 is a horizontal sectional view of the sliding hitch-ball holder and guide rack assembly of FIG. 3, taken about line 7—7.
Figure 5:
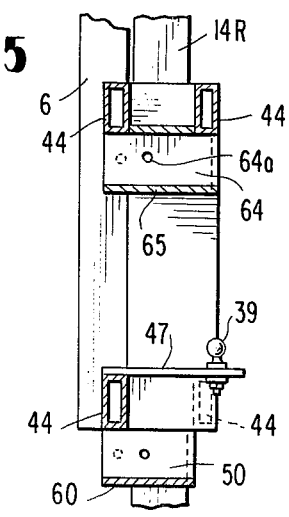
FIG. 5 is a sectional elevational view of a portion of the sliding hitch-ball holder and guide rack assembly of FIG. 3 taken about line 5—5.
Figure 6:
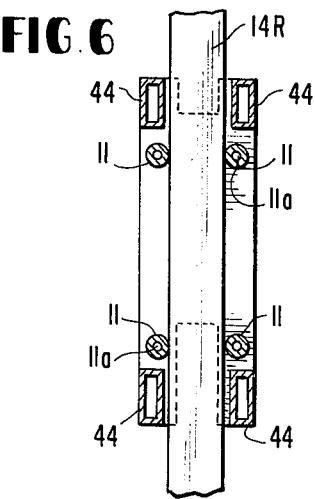
FIG. 6 is a vertical sectional view of a portion of the sliding hitch-ball holder and guide rack assembly of FIG. 3 taken about line 6—6.
Figure 4:
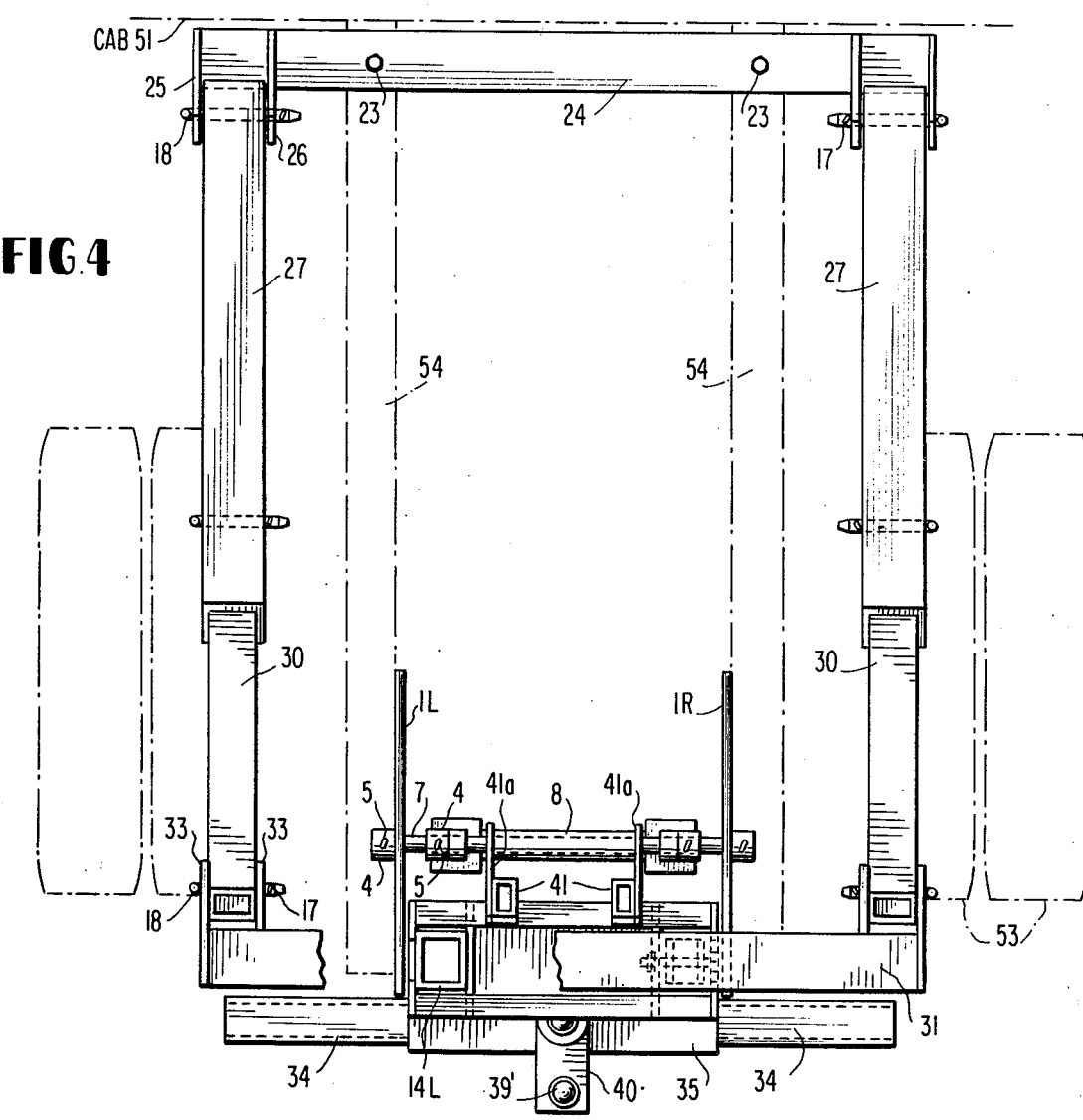
FIG. 4 is a top plan view of the assembly equipped vehicle of FIGS. 1, 2 and 3.

FIG. 7 illustrates the manner in which the "parking ball" assembly P is maintained and locked to carriage C within an alternate "parking ball" assembly pocket P', FIG. 3. In that regard, the body 40 bearing the parking ball 39' is received, has its end bearing the holes 40c projecting within a cavity or pocket P' defined by the vertical wall or plates 63, 64 and a bottom wall or plate 62. Vertical plates 63 and 64 bear respectively holes 63a and 64a and aligned with one of the holes 40c of the body 40. The walls 63 and 64 further bear horizontal, projecting pins 63b and 64b, respectively. The pin assemblies 37 and 38 are then mounted to the vertical sidewalls 63 and 64 by having the pins 37a of the pin assembly 37 projected through the aligned holes 63a and 40c, while simultaneously, the hole 37b within pin assembly 37 receives the pin 63b projecting laterally of the vertical wall 63. The same is true for the pin assembly 38 which mounts in the identical manner to the opposite vertical sidewall 64. Cotter clips are then forced through the holes within the projecting pins 63b and 64b to lock the pin assemblies in place, preventing the body 40 from being removed from the carriage C, under load. Once inserted, the pins 37a and 38a bear clips to maintain the pins in place. Further, the pins 37a and 38a cooperate with projecting pins and holes provided within opposed vertical sidewalls or plates 49 and 50 which are welded at their upper ends to the lower cross bars 44 of the carriage C, the sidewalls 49 and 50 being joined by a bottom wall 60 completing a second rectangular pocket P" which selectively receives the square "parking ball" body 40. In that respect, hole 37b formed within the left pin assembly 37 and hole 38b formed within the right pin assembly 38 receive the pins projecting outwardly from and fixed to the vertical sidewalls 49 and 50 of the carrier C subsequent to insertion of the body 40 within a slot defined by these two sidewalls and the lower plate 60. The pins 37a and 38a, on the other hand, pass through holes within the sidewalls 49 and 50 which are in transverse alignment and also aligned with the rearmost hole 40c in the direction of insertion of body 40 into the lower position slot above plate 60 of carriage C, FIG. 2.

FIG. 3 shows the "parking ball" assembly P mounted to the carriage C at pocket P" immediately beneath the fixed hitch-ball 39. The "parking ball" assembly P is alternately being positionable at a higher location of pocket P' within the cavity defined by opposed vertical plates 63 and 64 and bottom plate 65, FIG. 7.

The sliding hitch-ball holder H is raised on the guide rack defined by vertical poles 14L and 14R by hydraulic means in the illustrated embodiment of the invention. In that respect, there are illustrated dual telescoping hoist hydraulic cylinders 6 which extend vertically upwardly, are parallel to each other and disposed on the side of carriage C towards cab 51. In that respect, the hydraulic cylinders 6 comprise an outer casing 6a within which lies a piston (not shown) mounted to a piston rod 6b, one end of which projects outwardly through a hole at the upper end of the cylinder casing 6a. The bottom of the cylinder casing 6a bears a fitting 6c through which a shaft 7 projects horizontally defining a lower horizontal pivot axis for the hydraulic cylinder 6. The outboard end of the shaft 7 is received within a short length pipe or sleeve 4, shaft and pipe being apertured so as to permit passage of a cotter pin 5 for locking the shaft 7 at each end to respective metal mounting plates 1L, 1R. A second dowel or shaft 7 is pivotably mounted to the projecting end of the piston rod 6b in each instance, and short length sleeves 4 acting as stops are pinned to the extreme ends of the shaft or dowel 7 by way of cotter pins 5, the cylinders being spaced laterally by the utilization of cylindrical or tubular spacers 8 which are interposed between the cylinders and concentrically surround the shafts or dowels 7.

Projecting upwardly from the rearmost cross beam 44, FIG. 2, looking into the assembly from the rear of the vehicle, are vertical poles or posts 41, these poles 41 bearing mounting plates 41a which preferably are welded to the laterally outer sides of these posts. The plates are apertured at 41b to receive dowels or shafts 7, thus pivotably fixing the upper ends of the projecting piston rods 6b to the carriage C. The dual telescopic hydraulic hoist cylinders 6 receive both power from a take off (not shown) which is engaged in the cab 51 of the towing vehicle T which controls a pump (not shown) for pumping hydraulic liquid to the cylinders 6 in a conventional manner. Preferably, the cylinders 6 are under power only during the upward stroke and a release of fluid within the hydraulic cylinder allows the piston rods 6b to lower relative to the vertically fixed but pivotable hydraulic cylinder casings 6a.

In operation, by attaching the sliding hitch-ball holder and guide rack assembly A to a towing vehicle T, the driver and set up crew can hook up to the mobile or modular home or a modular home section on the dealer's lot and transport it over the highway en route to the customer's erection site. At the site, the home can be pulled or backed alongside of the foundation (basement or crawl space). If the site has obstacles in the way where sharper corners are needed, the power take off can be engaged, the pump energized and operated and hydraulic pressure fluid can be applied to the hydraulic cylinders 6 to raise the carriage C vertically, assuming that the home has been transported by use of the transport hitch-ball 39. After raising of the home, the home or that end of the home can be blocked so as to enable the transport hitch-ball 39 to be unhooked from the modular home. After blocking of the home in its raised position, the "parking ball" assembly P can be installed in the lower pocket P" as defined by vertical walls 49 and 50 and the bottom wall or plate 60 and pinned by way of pin assemblies 37 and 38, this assembly having the advantage of being located at a lower position and also extending the lift or parking hitch-ball 39 to a horizontal distance rearwardly of the vehicle T which is more remote from the other portions of carriage C than that of the transport hitch-ball 39. With the home rehooked to the "parking ball" assembly hitch-ball 39, additional maneuverability is provided to permit the home to be parked alongside of the basement even though the transpot requires the home to be maneuvered about relatively sharp corners. The hydraulic cylinders 6 are again actuated to raise the end of the home or section to the necessary vertical height so that the personnel can install a front roller kit under the home. Once the proper height is obtained, the operator installs pins 19' under the sliding hitch-ball holder H, specifically cross beams 44, so that the sliding hitch-ball holder H is resting on the pins 18 instead of simply being supported by the hoist hydraulic cylinders 6, while the men are working under the home so that there will be no chance of the cylinders 6 being accidentally released.

After the roller kit has been installed under the front of the home, the operator engages the control mechanism within the cab to raise the sliding hitch-ball holder H, i.e. carriage C, by feeding pressure hydraulic fluid to the cylinders 6 upon operation of the pump so that the operator can then remove the pins 19. The hydraulic cylinders 6 are then released, and the home is lowered onto the roller kit, and the hitch-ball is released from the home. The operator then moves the towing vehicle T to the rear of the home where there is previously installed an "A frame" to that end of the home so that the sliding hitch-ball holder H may then be connected thereto, to permit raising of the rear of the home in the same manner as was achieved with respect to the front of the home.

Should the ground be on a slope at the site location, the home must be unhooked and the guide rack adjusted so that regardless of the slope, it can be raised vertically, this being achieved by changing the pin connections between the telescoping poles 27-30, before the carriage C engages the home by way of either the hitch-ball 39 or 39'.

If the height needed should exceed that capable by either hitch-ball 39 at its fixed location or the "parking" hitch-ball 39' at its lowermost pocket P'', the "parking ball" assembly P may be installed in the upper pocket P' where it can then be connected to the home and the home raised to its maximum height permitted by the full extenson of the piston rod 6b of the hydraulic cylinders 6.

From the above, it is seen that due to the pivoting nature of the vertical poles 14L and 14R and the hydraulic cylinders 6, both mounted to the vertical mounting plates 1L and 1R fixed to the vehicle frame members 54, the carriage C and its rack poles can be tilted or inclined so as to pitch inwardly or outwardly with respect to a plane perpendicular to the longitudinal frame members 54 to compensate for ground which slopes either upwardly toward the front of the cab or downwardly towards the front of the cab on site. The sliding hitch-ball holder and guide rack assembly is designed to allow the quickest and most economical set up on site and at the same time provide to the set up crew a safe and quick mechanical arrangement that will allow them to overcome the most difficult set up problems normally requiring a crane to achieve modular home or sectional set up.

The sliding hitch-ball holder and guide rack assembly A was designed mainly for the transporting and setting up of factory built housing. Such homes are normally provided to the customer at a lower cost than stick built homes and permit the customer to be living in his new home in the shortest possible time.

While the invention has been particularly shown and described with reference to a preferred embodiment thereof, it will be understood by those skilled in the art that various changes in form and details may be made therein without departing from the spirit and scope of the invention.

What is claimed is:

1. A tiltable sliding hitch-ball holder and guide rack assembly for coupling one end of a mobile home to a towing vehicle or the like for towing and lifting on-site, said vehicle having a generally horizontal frame, said assembly comprising:

paired laterally opposed generally vertical poles mounted at their lower ends to said frame for limited pivoting about a horizontal axis, a carriage mounted to said vertical poles and extending therebetween for vertical movement on said poles, a transport hitch-ball carried by said carriage for coupling to said home one end and projecting axially upwardly parallel to said generally vertical poles, at least one hydraulic cylinder pivotably mounted at a lower end to said frame for pivoting about a horizontal axis parallel to and at generally the same height as the horizontal pivot axis for the lower ends of said vertical poles, having an upper end extendable with respect to its lower end, and having its upper end pivotably connected to said carriage, at its upper end, such that extension of said hydraulic cylinder causes said carriage and said hitch-ball to rise on said laterally opposed generally vertical poles, while permitting limited pivoting of said poles without interference by said hydraulic cylinder, and at least one extensible telescoping beam assembly pivotably coupled at one end to said horizontal frame at a point spaced from said pivot mounting of said paired vertical poles, and at its other end to the upper ends of said laterally opposed generally vertical poles;

whereby, by extension or retraction of said telescoping beam assembly and locking of the same in given position, said hitch-ball, said carriage and said generally vertical poles can be oriented at true vertical regardless of the angle of inclination of said vehicle and said generally horizontal frame conforming to the slope upon which the vehicle rests, to insure that the end of said modular home coupled to said hitch-ball is raised along a true vertical path during placement of the home on a preformed, on-site foundation.

2. The tiltable sliding hitch-ball holder and guide rack assembly as claimed in claim 1, wherein said transport hitch-ball is mounted on said carriage at a position such that during transport of the mobile home to the site, said hitch-ball is in general horizontal alignment with the pivot axis on the horizontal frame at the lower end of said paired vertical poles to maximize the load carrying capability of said sliding hitch-ball holder and guide rack assembly.

3. The tiltable sliding hitch-ball holder and guide rack assembly as claimed in claim 1, wherein said carriage comprises two pairs of plates, each plate of a given pair being mounted on opposite sides of a given vertical pole and bearing rollers mounted for rotation about their axis, mounted for rotation between said plates and in rolling contact with respective sides of said given vertical pole, and cross beams for coupling said two pairs of plates together and for supporting said transport hitch-ball with the hitch-ball projecting beyond the ends of said paired plates and said cross bars.

4. The tiltable sliding hitch-ball holder and guide rack assembly as claimed in claim 2, wherein said carriage comprises two pairs of plates, each plate of a given pair being mounted on opposite sides of a given vertical pole and bearing rollers mounted for rotation about their axis, mounted for rotation between said plates and in rolling contact with respective sides of said given vertical pole, and cross beams for coupling said two pairs of plates together and for supporting said transport hitch-ball with the hitch-ball projecting beyond the ends of said paired plates and said cross bars.

5. The tiltable sliding hitch-ball holder and guide rack assembly as claimed in claim 3, wherein said vertical poles are of rectangular cross-section, said carriage paired plates are of generally rectangular configuration, said cross bars extend between said paired plates at the four corners thereof and a flat hitch-ball mounting plate is centered between said paired plates and extends parallel thereto and bears said hitch-ball at one end which projects beyond the ends of said paired plates.

6. The tiltable sliding hitch-ball holder and guide rack assembly as claimed in claim 4, wherein said vertical poles are of rectangular cross-section, said carriage paired plates are of generally rectangular configuration, said cross bars extend between said paired plates at the four corners thereof and a flat hitch-ball mounting plate is centered between said paired plates and extends parallel thereto and bears said hitch-ball at one end which projects beyond the ends of said paired plates.

7. The tiltable sliding hitch-ball holder and guide rack assembly as claimed in claim 6, wherein said rollers mounted for pivoting about their axis, are eight in number and are mounted adjacent the cross bars at the four corners of said carriage to evenly divide the load exerted through said carriage to said vertical poles during transport of said mobile home and during on-site lifting of the end of said mobile home coupled to said assembly.

8. The tiltable sliding hitch-ball holder and guide rack assembly as claimed in claim 3, further comprising rectangular pockets formed by vertical sidewalls and a transverse bottom wall, beneath the cross bars at the top and bottom of said carriage and in line with said hitch-ball mounting plate, and wherein said assembly further comprises an elongated rectangular parking ball assembly sized and configured to said pockets for selective insertion within one of said pockets, said parking ball assembly bearing a parking hitch-ball at one end of the same which projcts from the ends of said paired plates a greater distance than that of said transport hitch-ball, and pin means for detachably locking said parking ball assembly within a selected one of said pockets such that on site, a given end of said mobile home can be raised or lowered to a maximum degree permitted by vertical movement of the carriage on said paired vertical poles, mounted to said parking hitch-ball.

9. The tiltable sliding hitch-ball holder and guide rack assembly as claimed in claim 7, further comprising rectangular pockets formed by vertical sidewalls and a transverse bottom wall, beneath the cross bars at the top and bottom of said carriage and in line with said hitch-ball mounting plate, and wherein said assembly further comprises an elongated rectangular parking ball assembly sized and configured to said pockets for selective insertion within one of said pockets, said parking ball assembly bearing a parking hitch-ball at one end of the same which projects from the ends of said paired plates a greater distance than that of said transport hitch-ball, and pin means for detachably locking said parking ball assembly within a selected one of said pockets such that on site, a given end of said mobile home can be raised or lowered to a maximum degree permitted by vertical movement of the carriage on said paired vertical poles, mounted to said parking hitch-ball.

10. The tiltable sliding hitch-ball holder and guide rack assembly, as claimed in claim 9, further comprising an upper cross beam connecting the upper ends of said vertical poles, and wherein said at least one telescoping beam assembly comprises two assemblies mounted to said horizontal frame and in longitudinal alignment with respective vertical poles and having their upper ends pivotably mounted to said upper cross beam and outboard of said vertical poles, said at least one hydraulic cylinder comprises a pair of hydraulic cylinders, said horizontal frame comprises laterally opposed longitudinally extending frame members and said means for pivotably mounting the lower ends of said vertical poles to said horizontal frame comprises dowels projecting from the sides of said vertical poles and passing through openings within vertical mounting plates affixed to respective frame members, and said means for pivotably mounting the lower ends of said paired hydraulic cylinders comprises pins projecting laterally from the lower ends of said cylinders and passing through second holes within said vertical mounting plate and being horizontally aligned with the holes bearing the dowels affixed to said vertical plates.

11. The tiltable sliding hitch-ball holder and guide rack assembly, as claimed in claim 10, wherein said at least one extensible telescoping beam assembly comprises dual assemblies of telescoping poles, holes are provided within respective telescoping poles of said telescoping beam assemblies and forming alignable rows, and locking pins projecting through aligned holes of respective poles for locking at a given telescoping position said poles to pivot said sliding hitch-ball holder and guide rack assembly vertical poles about the horizontal pivot axis at their lower end, and wherein said paired laterally opposed generally vertical poles carry a plurality of longitudinally spaced holes within said poles passing therethrough and locking pins projecting through given holes of respective vertical poles in the path of movement of at least one of said carriage cross bars to limit upward movement of said carriage during towing of said home and to prevent downward movement of said carriage and said home on site for safety purposes in case of hydraulic fluid pressure failure for said at least one hydraulic cylinder.

* * * * *